Feb. 4, 1969    M. A. HALLING    3,425,353
ARMING AND SAFETY MECHANISM FOR A DRAG CHUTE RETARDED BOMB
Filed Jan. 4, 1966    Sheet 1 of 2
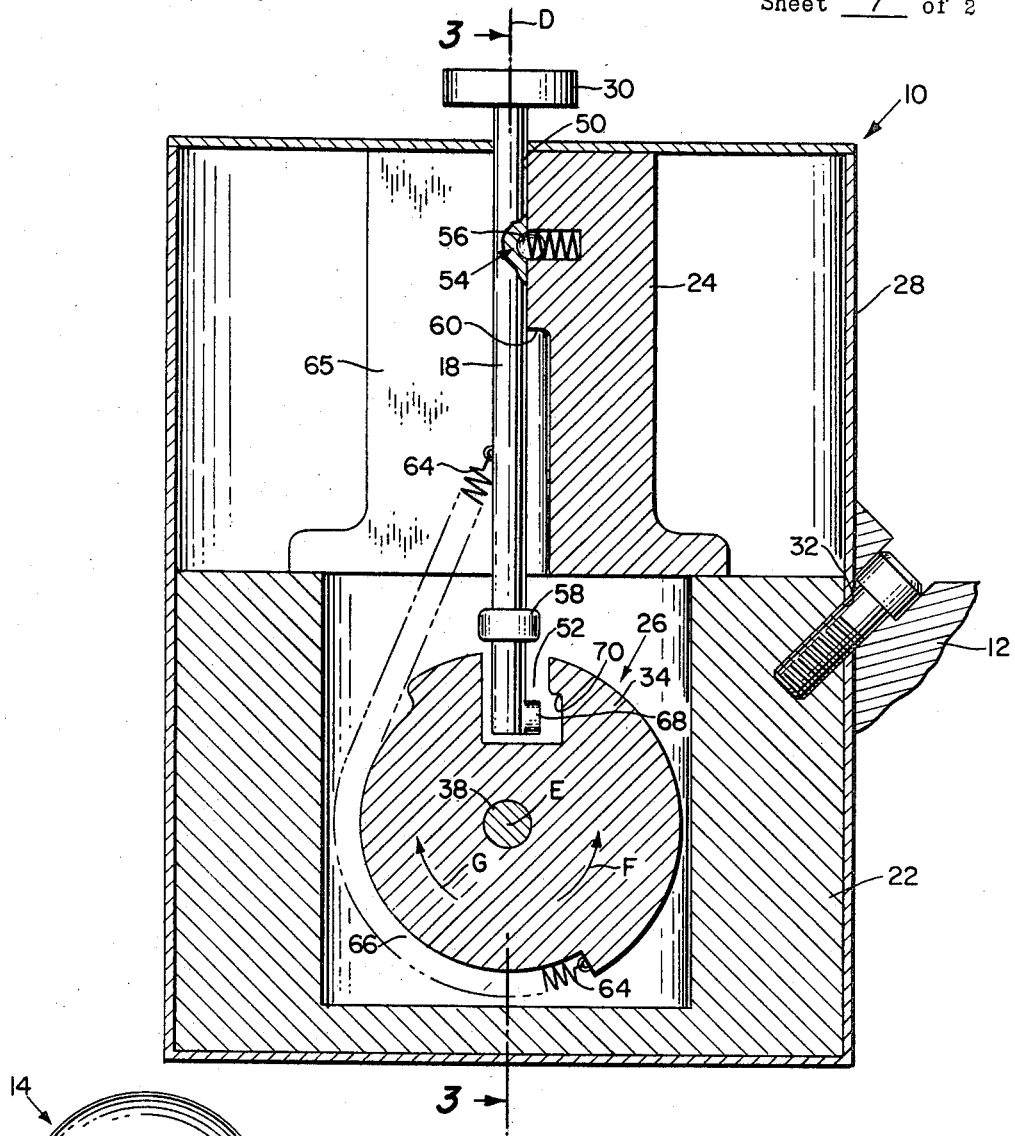
Fig. 2
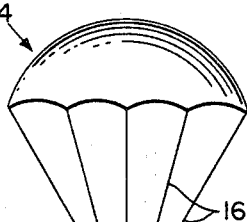
Fig. 1
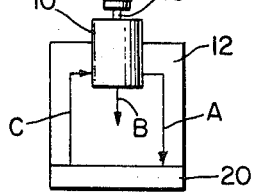
INVENTOR.
MICHAEL A. HALLING
BY
V. C. MULLER
ATTORNEY.

INVENTOR.
MICHAEL A. HALLING
BY
V. C. MULLER
ATTORNEY.

United States Patent Office 3,425,353
Patented Feb. 4, 1969

3,425,353
ARMING AND SAFETY MECHANISM FOR A DRAG CHUTE RETARDED BOMB
Michael A. Halling, China Lake, Calif., assignor to the United States of America as represented by the Secretary of the Navy
Filed Jan. 4, 1966, Ser. No. 518,729
U.S. Cl. 102—76                            6 Claims
Int. Cl. F42c 15/12

The invention described herein may be manufactured and used by or for the Government of the United States of America for governmental purposes without the payment of any royalties thereon or therefor.

This invention relates to arming and safety mechanisms for explosive ordnance, and more particularly to such a mechanism for use with a drag parachute retarded small bomb, or "bomblet," in circumstances where the bomblet is intended to explode above the ground, and only if the parachute has properly functioned.

Drag chute retarded bomblets are being increasingly used in tactical bombing operations in which a high degree of precision is desired. The drag chute serves to minimize dispersive effects of the fall and therefore enables achieving more accurate drop trajectories. Use of the smaller size bombs achieves better distribution of explosive effects over a given area, for a given weapon delivery aircraft payload.

Prior art arming mechanisms for aircraft launched bombs have been developed with the sole purpose in mind of overcoming the problem of safety to the launching aircraft and to those handling the ordnance, and these devices have operated on the principle of arming the bomb only after it has been exposed to a fall or drop environment for a predetermined time delay or distance of drop. The only form of such arming mechanism which has come into any extensive use has been the type in which the mechanism is actuated by rotation of a propeller under the aerodynamic environment experienced by the falling bomb. While this propeller type arming mechanism could be adapted to parachute retarded bomblets, the resulting structure of arming mechanism would be disproportionately bulky relative to the small size of the "bomblet."

Further, there is often a concomitant requirement that the explosive ordnance should *not* explode in event of a failure in the normal functioning of the drag chute. The propeller rotation form of arming mechanisms is responsive only to the aerodynamic environment, and cannot sense proper functioning of the drag chute. Accordingly, the use of a drag chute retarded bomblet for precision bombing has resulted in a need for an arming mechanism which not only provides for safety to the bomb delivery aircraft and to ground handling personnel, but which also performs its arming function only if the drag chute has properly functioned.

It also is desirable that the weapon disarm itself in the event it strikes ground without exploding, or in the event of occurrence of accidental start of the arming process, such as might occur by inadvertent pulling of the chute during handling or by shock force of a crash landing.

Accordingly, the objectives of the present invention include:

(1) Provision of an arming and safety mechanism for an aircraft dropped, parachute retarded, bomb fuzed to explode above the ground, which mechanisms arms the bomb only in response to the initial high shock force at the time the chute opens, and to the sustained retarding force by the chute acting on the bomb thereafter.

(2) Provision of an arming and safety mechanism in accordance with the previous objective which effects automatic permanent disarming of the explosive warhead in event of any interruption of the sustained retarding force upon the bomb by the drag chute before the latter explodes.

Other objects, advantages and novel features of the invention will become apparent from the following detailed description of the invention when considered in conjunction with the accompanying drawings wherein:

FIG. 1 is a partially side elevation, and partially a schematic of a drag chute retarded bomb illustrating the environment in which the arming and safety mechanism of the present invention is employed;

FIG. 2 is a central section through the arming and safety mechanism taken along line 2—2, FIG. 3;

Figure 3:
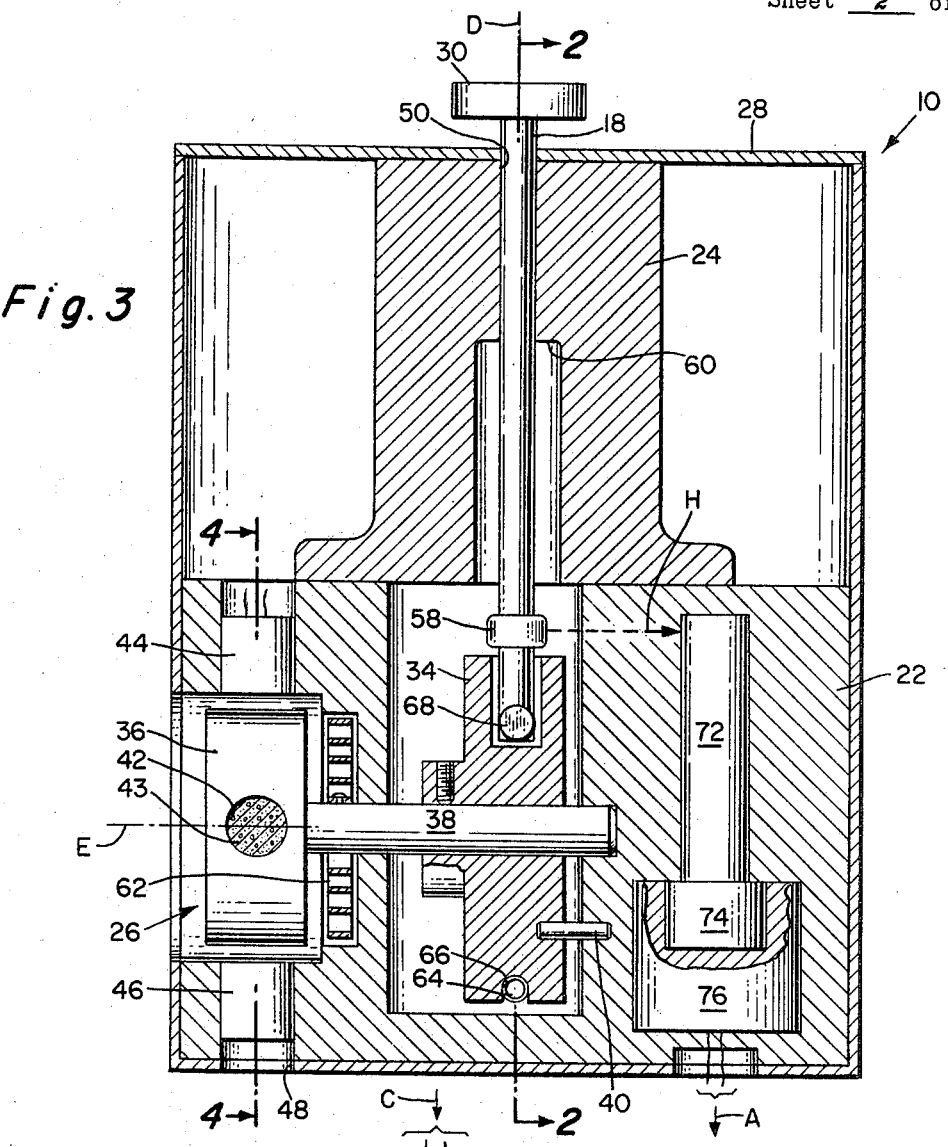
FIG. 3 is another central section of the mechanism taken along line 3—3, FIG. 2.

Referring now to the drawing, and in particular to FIG. 1, the subject of the invention is a drag chute operated arming and safety unit 10 for use in an organization consisting of a small explosive bomb, or "bomblet" 12, and a drag chute 14 for retarding the rate of fall of the bomblet after it is released from an aircraft. The arming and safety unit is affixed to the bomblet, and the shroud lines 16 from the canopy of the chute are connected to a movable pull shaft 18 projecting from the top of unit 10. The bomblet is typically adapted for exploding a predetermined distance above the ground by means of some suitable fuzing system 20, such as a radio fuze device. The arming and safety unit 10 further provides the electric power for the fuzing system, symbolically indicated by arrow A, and includes an explosive initiator and an interruptable pyrotechnic train, to be described in detail later in this specification, to detonate the main charge in the bomblet. The explosive output from the interruptable pyrotechnic train is symbolically indicated as arrow B. The signal which fires the initiator in arming and safety unit 10, symbolically represented by arrow C, is delivered to the latter from the fuzing system 20.

Referring now to FIGS. 2 and 3, the arming and safety unit 10 comprises, in general, a housing consisting of a main housing member 22 having a cylindrical outer configuration about an axis D, a concentrically aligned cylindrical upper housing member 24, a rotor assembly 26 having an axis of rotation E, FIG. 2, and the previously mentioned pull shaft 18. A canister 28 encloses all the components except the upper end of pull shaft 18, which forms a cap 30 to which the shroud lines 16 are connected. Suitable bolt holes 32, FIG. 2, only, are formed in main body member 22 for affixing unit 10 to the body of bomblet 12.

Figure 4:
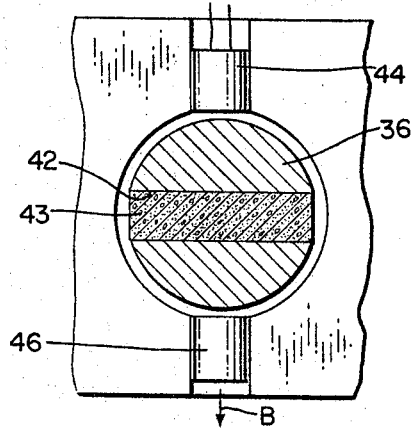
FIG. 4 is a section taken along line 4—4, FIG. 3.

Rotor assembly 26 comprises a latch wheel 34 and a pyrotechnic train wheel 36 rigidly affixed to a common shaft 38. A shear pin 40, made of a eutectic metal alloy having a low melting point, has one of its ends inserted in a small pin receiving opening formed in a lateral face of latch wheel 34, and its other end inserted in a pin receiving opening in a confronting wall of housing member 24. Shear pin 40 defines the angular position of rotor assembly 26 in unit 10 in its assembled and ready to use condition. This angular position is the one illustrated in the drawing, and is hereinafter referred to as the "initial unarmed position." As is described later in this specification, the shear pin 40 is made of low melting point eutectic metal for the reason that it also serves as a heat initiated time delay detent. As best shown in FIG. 4, pyrotechnic train wheel 36 has a diametrically aligned bore 42 for containing pyrotechnic material. When wheel 36 is rotated ninety degrees in angular position from its initial armed position, it co-operates with an electrically fired initiator element 44 disposed above the wheel and an output pyrotechnic element 46 below the wheel, to form a pyrotechnic train. The previously referred to electrical firing signal, arrow C, from fuzing system 20 is applied to the electrical leads of the initiator element 44. When the pyrotechnic train is initiated, the products of combustion from element 46 are directed through an opening 48 in the bottom of housing member 22 forming unit 10's previously referred to explosive output, arrow B. In the initial unarmed position, in which cavity 42 is out of alignment with the other elements of the pyrotechnic train, the pyrotechnic train is interrupted thereby preventing explosive output from device 10.

A bore 50 is formed in upper housing member 24 for slidingly supporting pull shaft 18. Latch wheel 34 of rotor assembly 26 has a latch cavity 52 for co-operation with pull shaft 18, which is aligned along axis D, when the rotor wheel is in its initial unarmed position. A ball and spring detent 54 co-operates with a hemi-spherical cavity 56 formed at a predetermined position along the length of pull shaft 18 to initially lock same in its inner or rotor latching position. In this rotor latching position the lower end of shaft 18 is disposed in latch cavity 52, and effectively forms a latch bolt for positively preventing any possible rotation of the rotor assembly 26 to the armed position. Ball and spring detent 54 provides sufficient locking strength to prevent pull shaft 18 from being withdrawn by a force less than the opening shock of the drag chute. An abutment collar 58 is formed around pull shaft 18 at a predetermined position near its lower end. A lower portion of bore 50 is sufficiently widened to allow predetermined travel of the abutment collar. This widened portion of the bore terminates in an abutment shoulder 60. Engagement of collar 58 against shoulder 60 defines the limit of outermost travel of pull shaft 18, hereinafter referred to as its rotor release position. Abutment of collar 58 against shoulder 60 also forms the means for transmitting the parachute drag forces to the frame of unit 10, and in turn to bomblet 12.

A flat coiled spring 62 has one of its ends affixed to the shaft 38 of the rotor assembly 26, and the other of its ends affixed to housing member 22; and is adapted to urge the rotor assembly in the angular direction of arrow F, FIG. 2. A helical tension spring 64 has one of its ends fastened to the periphery of latch wheel 34, and the other end attached to a predetermined position along pull shaft 18 approximately midway between its ends. In the initial unarmed position of rotor assembly 26, approximately one-half of the length of the spring is wrapped around the periphery of the rotor. Upper housing member 24 has formed therein a slot 65, which extends from the outer circumference of member 24 to bore 50, and which is in radially aligned about axis D to provide space for the upper end of spring 64. A guide groove 66 is formed in the peripheral surface of the latch wheel to receive the tension spring. Tension spring 64 exerts tension force which urges the rotor assembly 26 to rotation in the angular direction of arrow G, the opposite angular direction to that in which the coil spring urges the rotor assembly. This force is a variable force depending upon the rectilinear position of pull shaft 18. In the rotor latching position of pull shaft 18, the linear span of the spring is least, and the tension which it exerts is minimum. Spring 64 is so chosen that the tension exerted by it in this position is insufficient to overcome the urge of coiled spring 62, and the net force of both springs urge the rotor assembly in the direction of arrow F. The tension exerted by tension spring 64 is greatest when pull shaft 18 is in its rotor release position, and the force exerted by it in this position is sufficient to overcome the flat coiled spring and move the rotor assembly through an angular displacement of 90° to a position in which the diametric bore 42 in the pyrotechnic train wheel is aligned with the other pyrotechnic elements, which is the "armed position" of rotor assembly 26. Suitable limit stops, not shown, limit the angular movement of the rotor assembly in the angular direction of arrow G to such armed position.

A laterally projecting catch element 68 is formed at the lower end of pull shaft 10, and a co-operating abutment ledge 70 is formed in the lateral wall of the latch cavity 52, which confronts the catch element. Latch cavity 52 is sufficiently wide to allow withdrawal of the shaft 18, including the catch element, without interference with the ledge. However, in the event that rotor assembly 26 rotates in the angular direction of arrow F while the pull shaft is in its rotor latching position, the abutment ledge 70 acts as a permanent detent preventing withdrawal of the pull shaft.

Arming and safety unit 10 is further provided with a spring cocked firing pin mechanism 72, a battery heater 74 of the type employing a slow burning powder, and a thermal battery 76. These elements are all conventional, and per se form no part of the invention. A suitable linkage, symbolically indicated by dashed line H, releases the spring cocked firing mechanism upon withdrawal movement of the pull shaft from its rotor latching position. Release of the firing pin mechanism impacts a percussion detonator, not shown, which ignites the slow burning powder of the battery heater. Heat from the latter also energize the thermal battery providing the electrical power output, arrow A, of unit 10 at the electrical leads from the bottom end of the thermal battery. The heat from the battery heater 74 also co-operates with the low melting point shear pin 40, to serve as a time delay detent release, which releases the rotor assembly for angular movement under the urges of springs 62 and 64. A desired predetermined time after the battery heater is initiated, the shear pin 40 is sufficiently heated to weaken and shear, releasing the rotor assembly.

The operation of arming unit 10 with normal functioning of the drag chute 14 during drop of bomblet 12 is as follows: The shock force of the opening of the drag chute 14 overcomes the holding force of ball and spring detent 54, and pulls shaft 18 to its latch release position. The normal retarding force of the drag chute thereafter maintains pull shaft 18 in its rotor release position. The movement of pull shaft 18 from its rotor latching position initiates the battery heater 74. However, rotor assembly 26 remains in its initial unarmed position because of the holding action of shear pin 40. After the predetermined period of time it takes for the heat of the battery heater to be transmitted to the shear pin and weaken same for failure, the rotor assembly becomes unlocked and is rotated to its armed position under the force exerted by variable tension spring 64. The diametric bore 42 of the pyrotechnic train wheel is then aligned with the ends of pyrotechnic train, and the bomblet is in its armed position for detonation under control of the fuzing system 20.

Should the force of the drag chute be interrupted after the initial force has moved pull shaft 18 to its rotor release position, but before bomblet explodes, the spring force of the flat coil spring will return the rotor assembly, in the angular direction of arrow F, and the force of variable tension spring 64 will move the pull shaft in the inner direction, again inserting the lower end of the pull shaft in the latch cavity. In event shear pin 40 has failed, the further urging of the flat coil spring 62 will move the latch wheel into the safe-dud position in which pull shaft is permanently locked in the rotor latching position. If the shear pin has not failed at time of the interruption, it will do so after the predetermined delay associated with its heating, and the latch wheel will then move to its safe-dud position. It is to be noted that in event pull shaft 18 is returned to its inner position, the ball and spring detent 34 also again becomes seated in cavity 56, forming a further locking feature against forces less than the opening shock force of the chute.

Obviously many modifications and variations of the present invention are possible in the light of the above teachings. It is therefore to be understood that within the scope of the appended claims the invention may be practiced otherwise than as specifically described.

What is claimed is:

1. An arming device for use with a drag chute retarded aerial bomb, comprising, in combination:
   (a) a frame adapted to be affixed to an aerial bomb,
   (b) a rotor supported by the frame, having a radial latch receiving opening and a first detent means for locking said rotor in a predetermined initial position,
   (c) a slideable member adapted for rectilinear motion in a direction aligned with the latch opening of the rotor when the latter is in its initial position, and having a rotor latching position and a rotor release position, the outer end of the slidable member being adapted for attachment to the shrouds of the drag chute,
   (d) abutment means asociated with the slideable member and the frame for transmitting parachute drag forces to the frame when said member is in the rotor release position,
   (e) first spring means connected between the slide member and the rotor for urging the slide means toward its rotor latching position in absence of a parachute drag force, and for urging the rotor to rotate in one angular direction to an armed position when the slidable member is moved to its rotor release position under force of the drag chute,
   (f) timing means associated with the detent means adapted to release same to unlock the rotor for rotation of a predetermined time after said slideable member moves from said rotor latching position.

2. A device in accordance with claim 1,
   (g) said spring means being so constructed to provide a force to the rotor which varies in angular direction and magnitude under movement of the slideable member away from its rotor latching position of said slideable member urging said rotor to rotate in the opposite angular direction, and the slideable member being spaced from the lateral walls of the latch receiving opening in the rotor when the latter is in its initial position, and
   (h) engageable means associated with the slideable member and the rotor for preventing movement of the slideable member away from the rotor latching position upon the spring means moving the rotor away from its initial position in said opposite angular direction into a safe-dud position in engagement with the slideable member.

3. Apparatus in accordance with claim 2, wherein,
   (i) said spring means comprises first and second springs, said first spring consisting of a tension coil spring secured at one end to said slideable member near its upper end and secured by the other end to the periphery of the rotor, the second spring comprising a flat coil spring secured at one end to the rotor and secured at the other end to the frame, and adapted to urge the rotor in said opposite angular direction toward the safe-dud position, the tension in said first spring increasing under movement of the slideable member away from the rotor latching position to overcome the urge of the second spring.

4. Apparatus in accordance with claim 1, and
   (j) second detent means associated with the slideable member and the frame for locking the slideable means against movement away from its rotor latching position and to release same only in response to the force of the opening of the drag chute against the gravitational force on the bomb.

5. Apparatus in accordance with claim 4,
   (k) said second detent means adapted to relock the slideable means in event that same returns to its rotor latching position.

6. Apparatus in accordance with claim 1, said arming device being of the type having an interruptable pyrotechnic train,
   (l) said rotor having a diametrically aligned cavity for receiving pyrotechnic material extending between opposite diametric sides thereof, and out of alignment with the ends of the pyrotechnic train when the rotor is in its initial position and in alignment with the ends of the pyrotechnic train when the rotor is in its armed position.

No references cited.

SAMUEL W. ENGLE, *Primary Examiner.*

U.S. Cl. X.R.

102—81, 4